June 5, 1962 G. L. CLAPPER 3,038,091
THRESHOLD COUNTER WITH PARALLEL INPUTS
Filed June 29, 1960
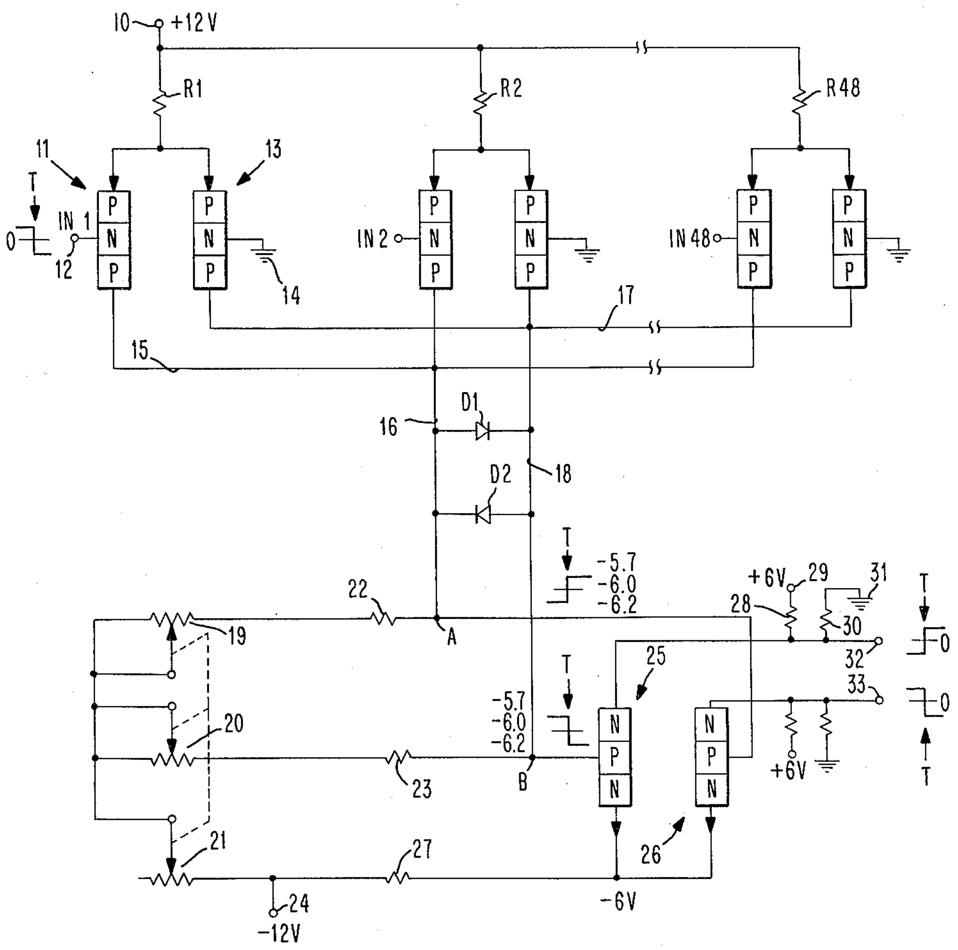
INVENTOR
GENUNG L. CLAPPER
BY G. R. Gugger
AGENT 3,038,091
THRESHOLD COUNTER WITH PARALLEL INPUTS Genung L. Clapper, Vestal, N.Y., assignor to International Business Machines Corporation, New York, N.Y., a corporation of New York Filed June 29, 1960, Ser. No. 39,617
6 Claims. (Cl. 307—88.5)

This invention relates to a counter circuit and more particularly to a counter of the analogue type which sums parallel inputs and compares the sum to a set threshold to determine if the threshold has been reached or exceeded.

Prior are counters of this type have had the serious disadvantage that when a large number of inputs are used the parameters of the circuit must be held to a very close tolerance to insure that the threshold level remains invariant. In the present circuit a floating reference is used so that the threshold will always be the same regardless of variations in circuit parameters such as power supplies. In the present circuit each input is applied to a differential current generator with the current generators being connected in parallel. Two-way diode limiting is used to keep the voltage on both parallel lines at nearly the same voltage. An adjustable divider is connected across the two parallel lines to set the reference voltage. A differential sense amplifier is connected between the two parallel lines to detect whether the sum of the inputs exceeds the threshold set by the adjustable divider. The reference voltage set on the adjustable divider remains substantially constant but it may vary to compensate for external condition. For example, an increase in the voltage supply to the input transistors will cause the floating reference level to rise so that the differential sense amplifier operates correctly.

Accordingly, it is an object of the present invention to provide an improved analogue type counter which sums parallel inputs and compares the sum to a set threshold to determine if the threshold has been reached or exceeded.

Another object of the present invention is to provide a counter as in the preceding object and which uses a floating reference so that the threshold will always be the same regardless of variations in circuit parameters.

The foregoing and other objects, features and advantages of the invention will be apparent from the following more particular description of a preferred embodiment of the invention, as illustrated in the accompanying drawing.

In the drawing:

The drawing shows a schematic circuit diagram of a threshold counter employing a floating reference potential in accordance with the present invention.

Referring to the drawing, there is shown the first, second and forty-eighth stages of a 48 stage counter with the number of stages being arbitrarily chosen for illustrative purposes. The stages are identical and they are connected in parallel to a positive 12 volt terminal 10 by way of associated metering resistors, such as indicated by the resistors R1, R2 and R48. Each stage comprises a pair of PNP type transistors which have their emitter electrodes connected in common with their associated metering resistor and, as will be seen, the transistor pairs form differential current generators which are used to develop a floating reference across an adjustable divider with a constant parallel impedance. Looking at the first stage, for example, the left-hand transistor 11 has its base electrode connected to an input signal terminal 12 and the right-hand transistor 13 has its base electrode connected to a source of ground potential 14. The left-hand transistor of each stage has its collector electrode connected to output lines 15 and 16 with line 16 terminating at reference point A which is on one side of the adjustable divider network and the right-hand transistor of each stage has its collector electrode connected to output lines 17 and 18 with line 18 terminating at reference point B which is on the other side of the adjustable divider network. A pair of diodes D1 and D2 are connected between the output lines 16 and 18 in reverse fashion to form a two-way limiter network for purposes to be described.

As was previously mentioned, an adjustable divider is provided across the two parallel output lines 16 and 18 to set a reference voltage for comparison with the sum of the parallel inputs to the differential current generators. The adjustable divider comprises the ganged adjustable potentiometers 19, 20 and 21 with potentiometer 19 connected by way of a limiting resistor 22 to the reference point A and output line 16 and the potentiometer 20 connected by way of a limiting resistor 23 to the reference point B and output line 18. The potentiometer 21 completes the circuit path from the reference points A and B to a minus 12 volt terminal 24. The adjustable divider is designed to provide a constant parallel impedance network and the total current flowing through reference points A and B may, for example, flow through 60 ohms effective impedance to the minus 12 volt terminal. The precision resistors R1, R2 . . . R48 are used to meter the current to the current switching transistors and the sum of all output currents is substantially constant so that a relatively constant voltage appears across the constant impedance network. Current flow will be constant and, irregardless of the ratio of "on" and "off" inputs, the sum of the currents will always be the same. Each metering resistor will allow about 2 mils of current resulting in about 100 mils for the 48 stages. 100 mils of current then will always flow through the 60 ohms constant impedance giving a 6 volt drop and placing the reference potential at points A and B at minus 6 volts.

The differential sense amplifier which utilizes signals of opposite polarity on the two lines that are referred to the floating reference voltage comprises two NPN type transistors 25 and 26 which have their emitter electrodes commoned to a resistor 27 and the minus 12 volt terminal 24. The voltage at the emitters will be substantially at minus 6 volts. Each collector electrode of transistors 25 and 26 connects into an individual terminating network comprising a resistor 28 and a positive 6 volt terminal 29 for supplying collector potential and a resistor 30 which is connected to a source of ground potential 31 for establishing the output reference at 0 volt.

The previously mentioned two-way limiting network comprising the diodes D1 and D2 is used to keep both output lines 16 and 18 near the reference voltage of minus 6 volts. One line will always be above this voltage and one below the potential of the lines differing by about 0.5 volt corresponding to the voltage drop across the conducting diode. Without the limiter, the output lines would have wide excursions in voltage as the inputs varied and this would result in over-dissipation in some cases and saturated conditions in others. The limiter holds both lines near minus 6 volts but allows for compensation of the floating reference and allows full sensitivity at the threshold "crossover." The voltage difference is sensed by the differential sense amplifier and out of phase outputs are produced. The outputs have substantially the same swing around ground as the inputs and they are a function of the number of inputs compared to the threshold.

A threshold counter of this type may be used, for example, to look at information and determine the percentage of inputs present without regard to the characters represented. Consequently, the counter is normally set for certain ranges of operation with a predetermined crossover point between ranges. For example, assume that resistors 22 and 23 are 50 and 100 ohms respectively and that the ganged potentiometers 19, 20 and 21 are adjustable from 75–0, 0–75 and 0–15 ohms respectively. The potentiometers are fitted with a dial reading from 0 to 100 and readings are obtained by setting the input conditions and then adjusting the potentiometers, maintaining a constant parallel impedance of approximately 60 ohms, until the voltage at the output is 0 volt, indicating the mid-point of a threshold crossover. For example, with 20 of the 48 inputs "on" or active, setting of the potentiometers in the percentage range of 27–31 with the optimum point at 29 produced satisfactory outputs. For this particular case the threshold crossover point would be at 32 since the presence of 21 active inputs requires a potentiometer range of 33–37 to produce a satisfactory output. The following chart illustrates various useful ranges through which good outputs could be obtained with their associated crossover points and the optimum or desired operating point for each range:

| Inputs | | Potentiometer Readings | | |
|---|---|---|---|---|
| On | Off | Range | Crossover | Optimum |
| 18 | 30 | 0-18 | 19 | 14 |
| 19 | 29 | 20-25 | 26 | 22 |
| 20 | 28 | 27-31 | 32 | 29 |
| 21 | 27 | 33-37 | 38 | 35 |
| 22 | 26 | 39-43 | 44 | 41 |
| 23 | 25 | 45-49 | 50 | 47 |
| 24 | 24 | 51-55 | 56 | 53 |
| 25 | 23 | 56-60 | ------ | 58 |

In the initial state or "off" condition of the counter all of the right-hand transistors in the input stages will be conducting. Looking at the first stage, for example, in the absence of an input signal transistor 13 will be conducting and current flows from the positive 12 volt terminal 10, through the output lines 17 and 18, point B, resistor 23 and potentiometers 20 and 21 to the minus 12 volt terminal 24. The voltage at point B becomes high relative to the voltage at point A and diode D2 becomes conducting and current is shunted therethrough to raise the voltage at point A almost up to the voltage at point B. The total current flowing through points A and B will flow through the 60 ohms of effective impedance to the minus 12 volt terminal. With point B at approximately minus 5.7 volts and point A at approximately minus 6.2 volts the NPN transistor 25 of the sense amplifier will be conducting and NPN transistor 26 non-conducting and hence the output voltages will be down at output terminal 32 and up at output terminal 33.

The input signals are standard current switching signals around the ground reference and the output signals are similar and are referred to ground by means of the standard current switching terminating networks. When the input signal to the first stage becomes active the left-hand transistor 11 will switch to the conducting state and transistor 13 will switch off and thus current flow will be added to the output lines 15, 16 and subtracted from the output lines 17, 18. Assuming now that at time T sufficient parallel inputs are activated to cross the threshold set by the adjustable divider, sufficient current will flow from the conducting left-hand transistors into the output lines 15 and 16 to raise the voltage at point A to a higher value than the voltage at point B. Diode D2 will switch off and diode D1 will become conducting to raise the voltage at point B almost up to point A. With point A now at approximately minus 5.7 volts and point B at approximately minus 6.2 volts transistor 25 of the sensing amplifier will switch off and transistor 26 will become conducting. The output voltages will now swing up at terminal 32 and down at terminal 33 indicating that the threshold has been reached or exceeded. Before time T, the operating inputs are below the threshold.

Although the reference voltage remains substantially constant under normal conditions, it may vary if there is need to compensate for external conditions. For example, an increase in the positive 12 volt supply to the precision current metering resistors will increase the total current flowing in the circuit. The floating reference level then rises to compensate for the increase so that the differential sense amplifier operates correctly. Drift transistors may be utilized in this circuit for high speed operation at a megacycle or above.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An analogue counter circuit of the class described comprising a plurality of parallel input signal lines, a plurality of parallel differential current generators each one of which is responsive to a related one of said input signal lines and each having a pair of outputs, a source of potential energizing said differential current generators, a first output line connected to one output of each differential current generator for carrying current from said current generators when their related input signal lines are inactive, a second output line connected to the other outputs of the differential current generators and connected in parallel with said first output line for carrying current from said current generators when their related input signal lines are active, adjustable divider means having a constant parallel impedance connected across said first and second output lines, said differential current generators developing a floating reference voltage across said divider, differential sense amplifier means connected across said parallel output lines for comparing the sum of the parallel input signals which are active against said reference voltage to determine if a threshold has been reached or exceeded, and a terminating network connected to said amplifier for producing output signals, said output signals being a function of the number of active input signals compared to said threshold.

2. An analogue counter circuit as defined in claim 1 and including a two-way diode limiting circuit connected between said first and second parallel output lines to maintain both said output lines near the reference voltage, one output line always being above and the other output line below said reference voltage.

3. An analogue counter circuit as defined in claim 1 and including a plurality of metering resistors connected between said potential source and said differential current generators to meter the current to said generators whereby the sum of all output currents in said first and second output lines will be substantially constant and a relatively constant reference voltage will appear across said constant parallel impedance, said reference voltage remaining substantially constant during normal operation but varying under control of said metering resistors to compensate for any change in said potential source to insure correct operation of said differential sense amplifier.

4. An analogue counter circuit of the class described comprising a plurality of parallel input signal lines, a plurality of parallel current switching blocks, each of said blocks comprising a first and second transistor with the first transistor of each block being responsive to a related one of said input signal lines, a common source of potential for said transistors, a first output line common with said first transistors for transmitting current from those blocks whose related input signal lines are active, a second output line parallel with said first output line and common with said second transistors for transmitting current from those blocks whose related input signal lines are inactive, adjustable potentiometer means having a constant parallel impedance network connected across said first and second output lines, said current switching blocks developing a floating reference voltage across said impedance network, differential sense amplifier means comprising a pair of transistors one of which is responsive to said first output line and the other of which is responsive to said second output line for comparing the sum of the parallel input signals which are active against said set reference voltage to determine if a threshold has been reached or exceeded, and a terminating network connected to each transistor of said sense amplifier for producing output signals, said output signals being a function of the number of active input signals compared to said threshold.

5. In an analogue counter circuit for summing parallel inputs and comparing the sum to a set threshold to determine if the threshold has been reached or exceeded, the combination of, a plurality of parallel input signal lines, a plurality of parallel current switching blocks, each of said blocks comprising a first and second transistor with the first transistor of each block being responsive to a related one said input signal lines, a source of supply voltage for said transistors, a first output line common with said first transistors for transmitting current from those blocks whose related input signal lines are active, a second output line parallel with said first output line and common with said second transistors for transmitting current from those blocks whose related input signal lines are inactive, a source of return voltage for said transistors and output lines, adjustable potentiometer means having a constant parallel impedance network connected across said first and second output lines, said current switching blocks developing a reference voltage across said impedance, and a current metering resistor connected between each of said switching blocks and said source of supply voltage, said current metering resistors being responsive to a change in the supply voltage or the return voltage to change the total current flowing in said circuit whereby said reference voltage is caused to float accordingly.

6. An analogue counter circuit of the class described comprising a plurality of parallel input signal lines, a plurality of parallel differential current generators each one of which is responsive to a related one of said input signal lines and each having a pair of outputs, a source of potential energizing said differential current generators, a first output line connected to one output of each differential current generator for carrying current from said current generators when their related input signal lines are inactive, a second output line connected to the other outputs of the differential current generators and connected in parallel with said first output line for carrying current from said current generators when their related input signal lines are active, divider means having a constant parallel impedance connected across said first and second output lines, said differential current generators developing a floating reference voltage across said divider, differential sense amplifier means connected across said parallel output lines for comparing the sum of the parallel input signals which are active against said reference voltage to determine if a threshold has been reached or exceeded, and a terminating network connected to said amplifier for producing output signals, said output signals being a function of the number of active input signals compared to said threshold.

References Cited in the file of this patent

UNITED STATES PATENTS 2,964,652 Yourke ________________ Dec. 13, 1960